INVENTOR.
JAMES F. MEACHAM
BY
OSTROLENK, FABER, GERB & SOFFEN
ATTORNEYS

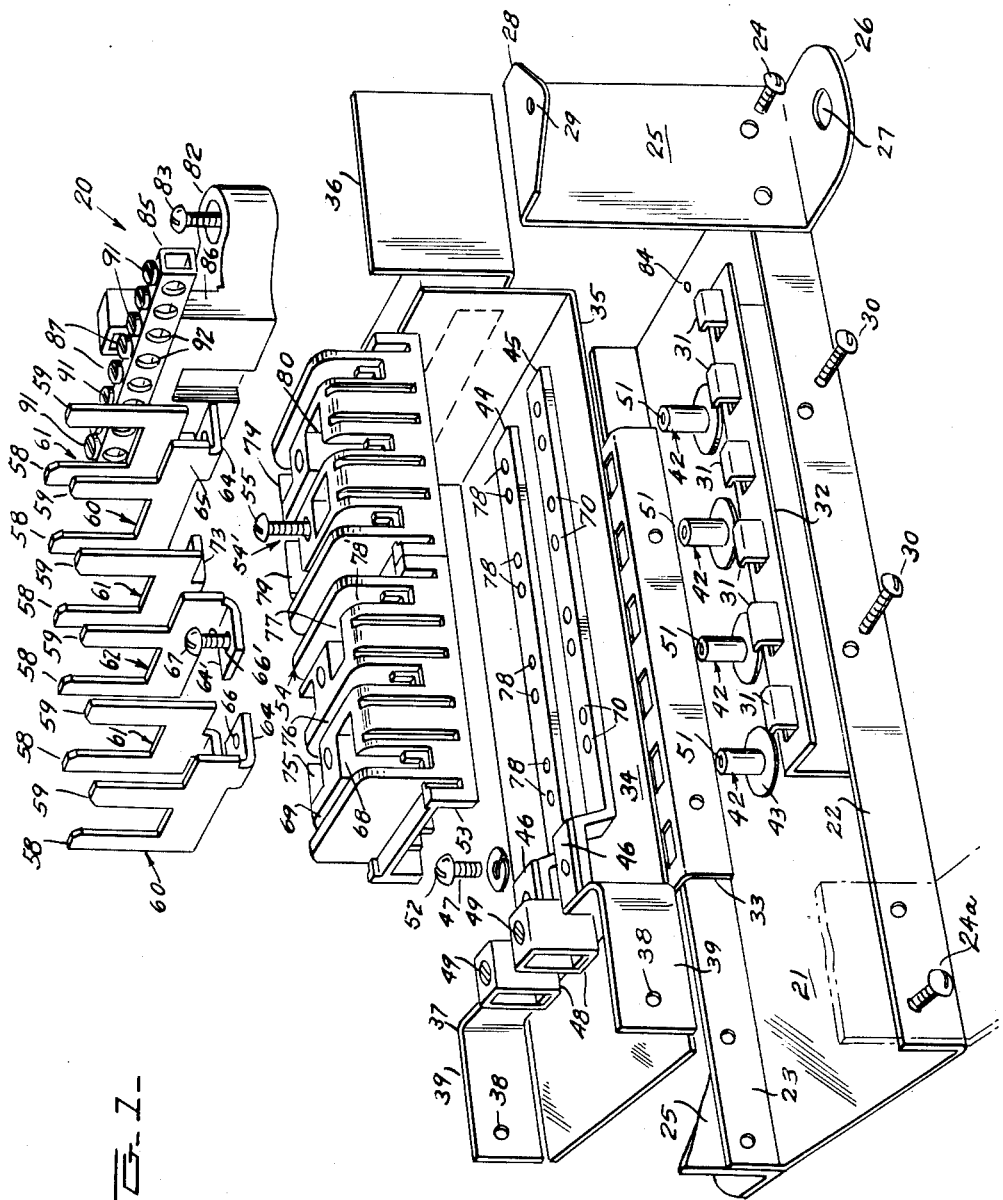

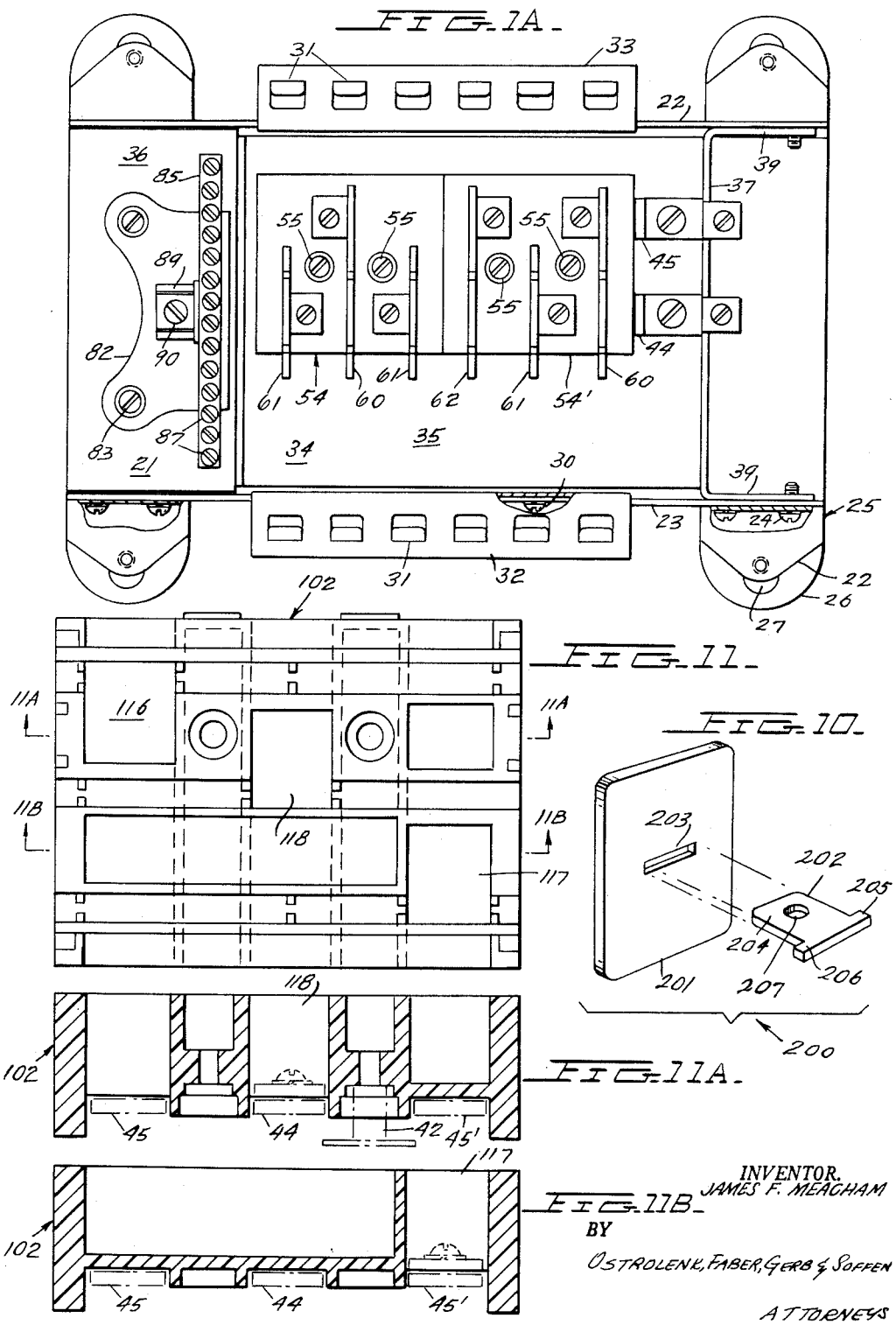

Aug. 17, 1965    J. F. MEACHAM    3,201,657
PANELBOARD FOR BOLTED AND PLUG-IN CIRCUIT BREAKER
Filed June 8, 1960    5 Sheets-Sheet 5
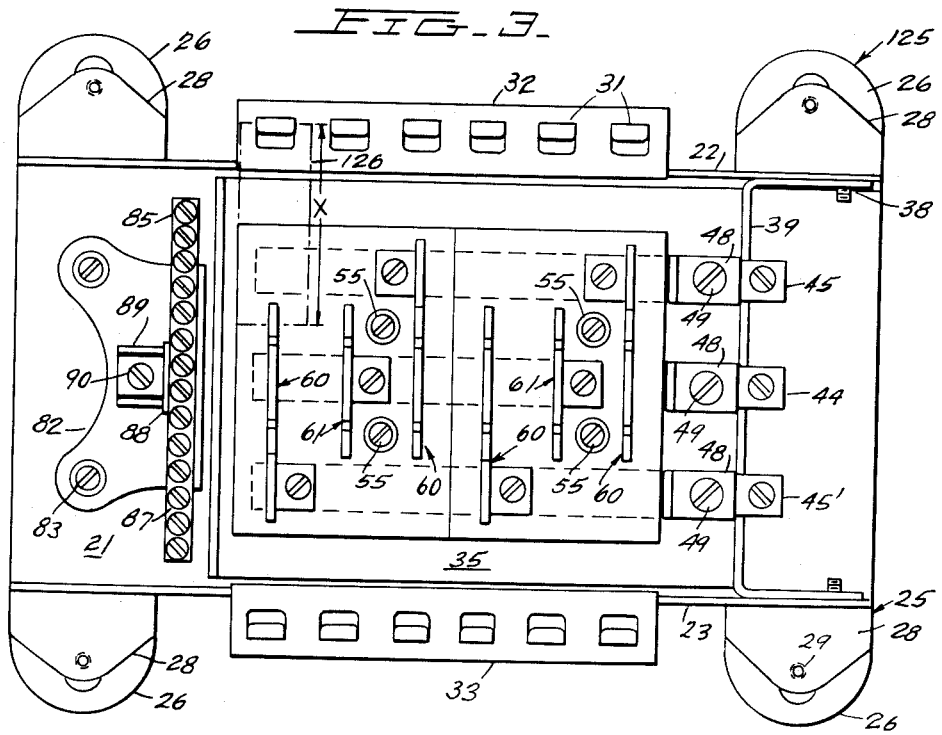
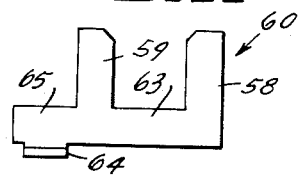
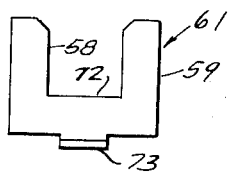
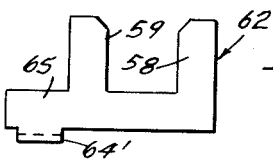
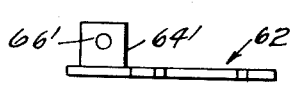
INVENTOR.
JAMES F. MEACHAM
BY
OSTROLENK, FABER, GERB & SOFFEN
ATTORNEYS United States Patent Office 3,201,657
Patented Aug. 17, 1965

3,201,657
PANELBOARD FOR BOLTED AND PLUG-IN CIRCUIT BREAKER
James F. Meacham, Atlanta, Ga., assignor to I-T-E Circuit Breaker Company, Philadelphia, Pa., a corporation of Pennsylvania
Filed June 8, 1960, Ser. No. 34,782
5 Claims. (Cl. 317—119)

This invention relates to panelboards in general and more particularly to panelboards which are readily constructed to receive either bolted or plug-in type circuit breakers.

Panelboards for home and light industrial applications are generally constructed either to receive circuit breakers having plug-in jaws or are constructed to receive circuit breakers requiring a bolted line side connection. Because of this, panelboard makers have been required to provide and stock panelboards having two distinct constructions. This has proven to be costly of both material and space.

In order to overcome this difficulty the instant invention provides panelboard constructions utilizing common elements whereby bolted and plug-in type panelboards are substantially the same. That is, the two different types of panelboards utilize the same elements with one exception, namely, the connecting straps which the circuit breakers engage at the line end which of necessity are different for bolted circuit breakers than for plug-in circuit breakers. However, all of the other elements of the panelboard are the same.

This is accomplished by spacing the load side mounting ledges apart by the distance necessary to accommodate two bolted circuit breakers in end to end relationship. When plug-in circuit breakers are mounted in the panelboard they do not abut since the line terminals thereof are confined within the housing rather than projecting from the line end thereof as in the case of a bolted circuit breaker. Thus, the straps utilized for plug-in circuit breakers are constructed with a U-shaped section to provide spaced apart blades.

This construction provides additional flexibility in that the panelboard may readily be adapted for the mounting of plug-in breakers of much higher current ratings by merely changing the strap construction so that the space beween the arms of the U is filled in. This provides a larger blade required for a higher current connection. The additional length of the higher rated breakers is accommodated in the space which would be present between the ends of the lower rated plug-in circuit breaker.

Accordingly, a primary object of the instant invention is to provide novel panelboard constructions whereby panelboards for bolted and plug-in circuit breakers utilize substantially identical elements in the constructions thereof.

Another object is to provide a bolted and plug-in panelboard construction whereby the panelboard assembler is required to stock a minimum number of parts.

Still another object is to provide bolted and plug-in panelboard constructions differing from one another merely by the conducting straps utilized.

A further object is to provide a novel construction for an interphase barrier utilized in a panelboard to receive bolted circuit breakers.

A still further object is to provide a three phase panelboard construction wherein only two different conducting strap configurations are required.

These as well as other objects of the instant invention shall become readily apparent after reading the following description of the accompanying drawings in which:

FIGURE 1 is an exploded perspective of a single phase three wire panelboard constructed in accordance with the teachings of the instant invention and adapted to mount plug-in type circuit breakers. Duplicate fastening screws and mounting brackets have been eliminated for the sake of clarity.

FIGURE 1A is a plan view of the panelboard of FIGURE 1 with details of the insulating block omitted.

FIGURE 3 is a plan view of a three phase four wire panelboard constructed to mount plug-in type circuit breakers with details of the insulating block omitted.

FIGURES 4–6 are side elevations of different plug-in strap constructions.

FIGURES 4A–6A are plan views of the straps illustrated in FIGURES 4–6, respectively.

FIGURES 7A–9A are plan views of the straps illustrated in FIGURES 7–9, respectively.

FIGURE 10 is an exploded perspective of an interphase barrier utilized in the bolted type panelboard when a circuit breaker location is not occupied by a circuit breaker.

FIGURE 11 is a plan view of an insulating block utilized in the three phase panelboards illustrated in FIGURES 2 and 3.

FIGURES 11A–11B are cross-sections of FIGURE 11 taken through lines 11A—11B, respectively, looking in the direction of the respective arrows.

Figure 2:
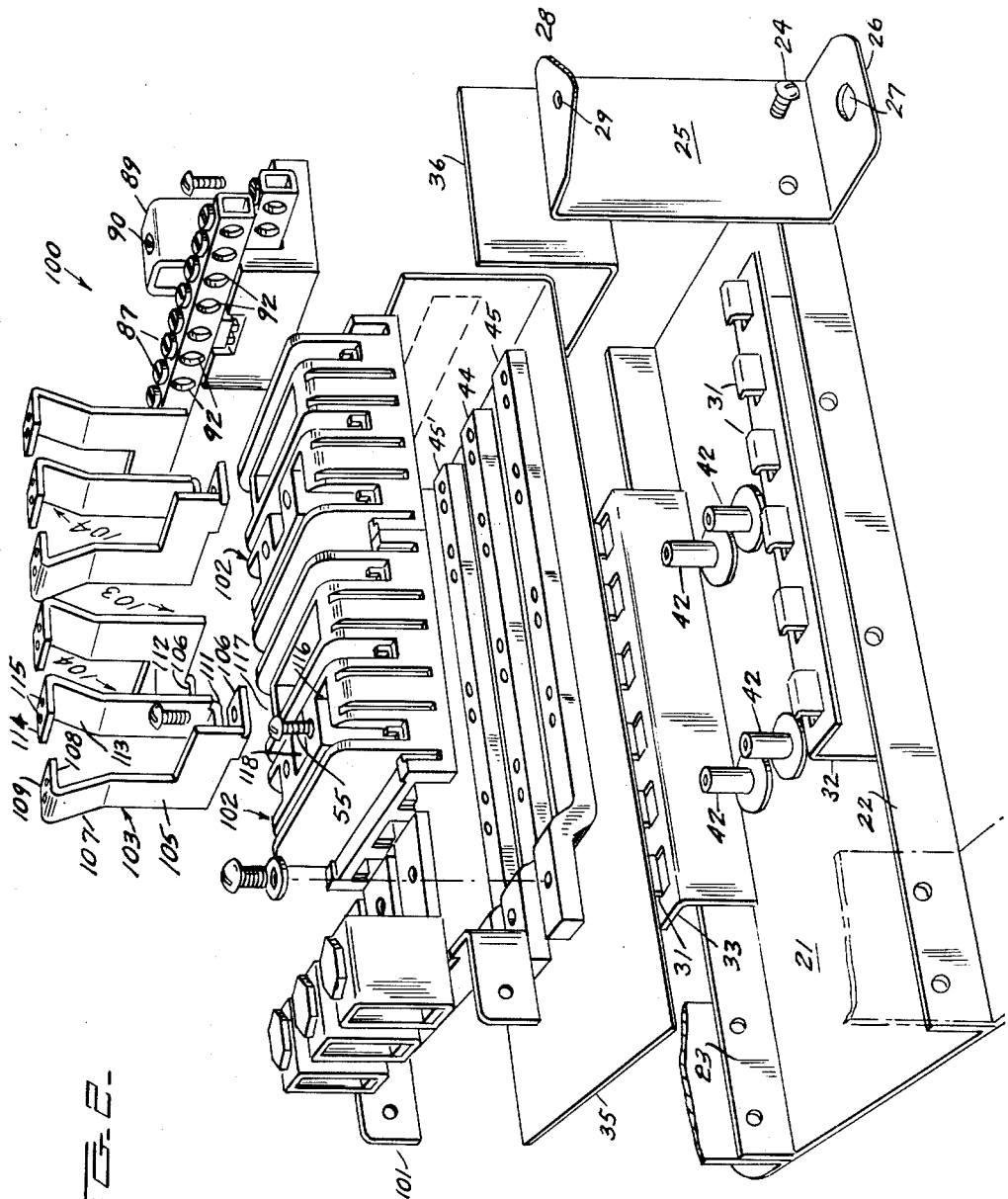
FIGURE 2 is an exploded perspective of a three phase four wire panelboard constructed in accordance with the teachings of the instant invention and adapted to mount bolted circuit breakers.

Now referring more particularly to FIGURES 1 and 1A, single phase three wire panelboard 20 includes an elongated backing plate 21 having upwardly turned sides 22, 23 extending along the long edges thereof. Two retaining screws 24 secure each of four U-shaped brackets 25 to plate 21 at each corner thereof. The lower arm 26 of each bracket 25 is provided with an aperture 27 to receive a bolt means for mounting panelboard 20 within an enclosure. The other arm 28 of bracket 25 is provided with a threaded aperture 29 which receives a screw for securing an appropriately shaped face plate (not shown) to panelboard 20.

Screw 30 secures mounting ledges 32, 33 to plate sides 22, 23, respectively. Lugs 31 integrally formed with mounting ledges 32, 33 are provided for mechanical securement of the load side of circuit breakers mounted to panelboard 20 in a manner well known to the art.

Insulating sheet 34, having one end 35 upwardly turned, overlies substantially all of backing plate 21 while U-shaped neutral insulator sheet 36 is positioned at the other end of sheet 34 and is retained to plate 21 by screw 24a which extends through clearance aperture 38 in the arms 39 of lug support 37.

Sheet 34 is provided with openings (not shown) which are aligned with threaded apertures (not shown) in plate 21. Insulated mounting bushings 42 extend through these openings in sheet 34 with the enlarged disk-like portions 43 of bushings 42 being sandwiched between plate 21 and sheet 34.

Panelboard 20 further includes two flat elongated bus bars 44, 45 disposed between mounting ledges 32, 33 and extending parallel thereto. One end of each of the bus bars 44, 45 is offset upwardly and a main lug assembly 46 is mounted to the upturned portion by a screw 47. Each assembly 46 includes a tubular member 48 disposed within a U-shaped cutout of main lug support 37.

Conductor securing screw 49 is threadably mounted to tubular portion 48 in a manner well known to the art. Tubular members 48 are adapted to receive the two hot wires of a single phase three wire system.

Bus bars 44, 45 extend through grooves 52, 53 of insulating blocks 54 and 54' mounted in abutting end to end relationship. Bushings 42 extend upwardly between bus bars 44, 45 and are entered into recesses (not shown) in the underside of blocks 54 and 54'. Screws 55 extend through appropriate clearance holes of blocks 54, 54' as well as through the center openings 51 of bushings 42 and are received by threaded apertures of plate 21 to fixedly secure insulating blocks 54, 54' to plate 21.

Circuit breaker electrical connections to bus bars 44, 45 are made through the engagement of the circuit breaker line terminals with one of the blades 58, 59 which extend upwardly from blocks 54, 54'. Two blades 58, 59 are provided for each of the three conducting straps 60, 61, 62 associated with each insulating block 54.

As best seen in FIGURES 4 and 4A blades 58, 59, comprise the arms of a generally U-shaped portion 63 of strap 60. The web of U-shaped portion 63 extends in the plane thereof past blade 59 and a foot 64 projects from this extending portion 65. Foot 64 extends substantially at right angles to the plane of blades 58, 59 and is provided with a clearance hole 66 which receives a securing screw 67. Foot 64 is disposed within recess 68 of block 54 while the web of the U as well as extending portion 65 are disposed within block slot 69 which extends transverse to the direction of bus bars 44, 45 and communicates with recesses 68.

The bottom of recess 68 is provided with a clearance aperture through which screw 67 extends and is received by the appropriate threaded aperture 70 in bus bar 45. Thus, a single screw 67 electrically connects a strap 60 to bus bar 45 and at the same time mechanically secures both strap 60 and bus bar 45 to insulating block 54.

The blades 58, 59 of strap 61 are in turn the arms of a generally U-shaped conducting portion 72. Foot 73 extends at right angles to the web of U-shaped portion 72 and is centrally located along the lower edge thereof. Foot 73 is disposed within recess 75 of block 54 and the web of the U-shaped portion 72 is disposed within transverse slot 76 which communicates with recess 75. A screw 67 extends through clearance opening 77 in foot 73 as well as through a clearance opening at the bottom of recess 75 and is received by one of the threaded apertures 78 of bus bar 44. This electrically connects straps 61 to bus bar 44 and at the same time mechanically secures both strap 61 and bus bar 44 to block 54.

Strap 62 is of the same construction as strap 60 except that foot 64' thereof extends from portion 65 in a direction opposite to foot 64. A screw 67 passes through the opening at the bottom of recess 77 and is received by another one of the threaded apertures 70 of bus bars 45. This electrically connects strap 62 to bus bar 45 and at the same time mechanically secures strap 62 and bus bar 45 to insulating block 54. Foot 64' is disposed within transverse slot 78' which communicates with recess 77.

In a similar manner, two straps 61 are mounted to insulating block 54' with feet 73 being disposed within top recesses 79 of block 54'. Screw 67 electrically connects and mechanically secures the last two recited straps 61 to bus bar 44 by engagement with threaded aperture 78. Positioned between the last two recited straps 61 is another strap 60 whose leg 64 is disposed within recess 80 of block 54' and is electrically connected and mechanically secured to bus bar 45 by screw 67.

Thus, it is seen that all of the blades 59 are aligned in a row parallel to mounting ledges 32, 33 and that blades 58 are aligned in another row parallel to mounting ledges 32, 33 with the row of blades 59 being spaced from mounting ledge 32 by a distance equal to the distance between blades 58 and mounting ledge 33. Slots 69, 76 and 78', as well as the transverse slots of insulating block 54', are sufficiently deep so that the webs of each of the straps 60–62 are disposed entirely therein and no other means is required to maintain voltage clearance between adjacent blades 58 or adjacent blades 59.

Panelboard 20 further includes neutral assembly 81 which comprises an insulator 82 positioned on the top side of neutral insulator sheet 36 and secured to plate 21 by screws 83 which pass through appropriate clearance holes of neutral insulator 36 and are received by threaded apertures in plate 21. Neutral bar 85, which is a tubular member, is positioned on the top surface of the upwardly extending insulator portion 86 and is secured thereto by screws 87. These screws 87 also pass through conductor 88 which is part of a main lug assembly including tubular member 89 which receives the neutral cable. Screw 90 threadably mounted to tubular member 89 secures the neutral cable in place. Neutral bar 85 further includes a plurality of clamping screws 91 threaded thereto and aligned with transverse wire receiving apertures 92.

Figure 2A:
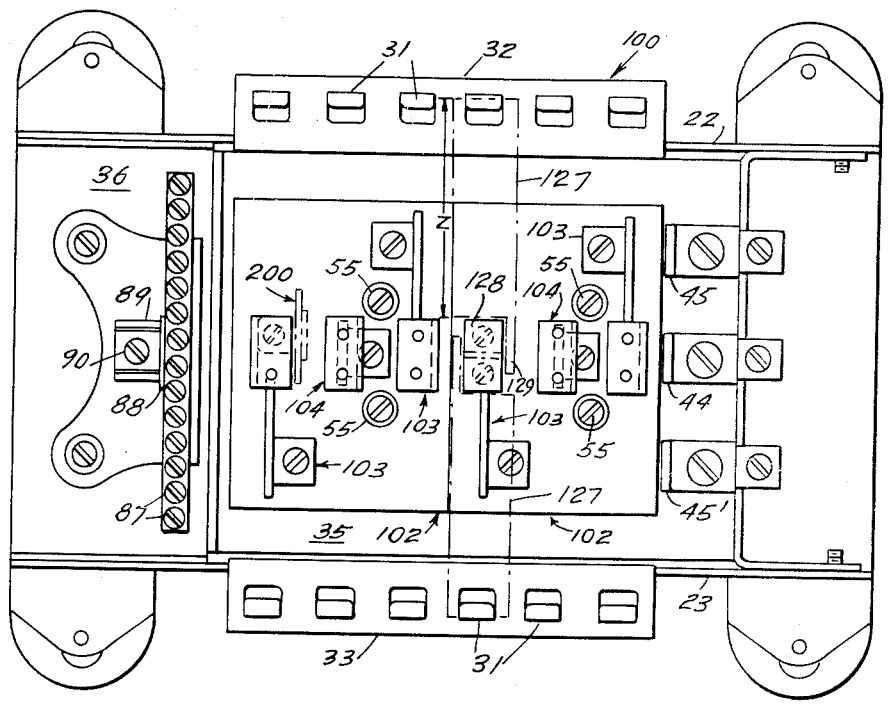
FIGURE 2A is a plan view of the panelboard of FIGURE 2 with details of the insulating block omitted.
Figures 7, 7B, 8, 9, 9B:
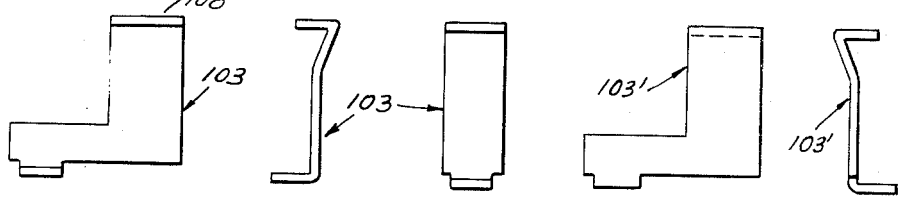
FIGURES 7–9 are side elevations of different bolted strap constructions.
FIGURES 7B and 9B are end views of the straps illustrated in FIGURES 7 and 9, respectively.
Figure 7A:
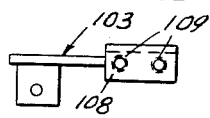
Figures 8A, 9A:
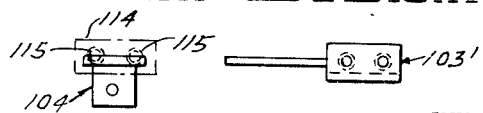

Now referring more particularly to FIGURES 2 and 2a, panelboard 100 illustrated therein is adapted for mounting of bolted type circuit breakers and connection to a three-phase four-wire system. A substantial number of the elements of panelboard 100 are identical to the elements of panelboard 20. Where this is so, identical reference numerals are utilized and the description thereof is not repeated.

A third bus bar 45' has been added between bus bar 44 and mounting ledge 33. The main lug insulator 101 is provided with cutouts to receive three main lugs 48. Mounting bushings 42 are in slightly different positions as are the holes through insulator sheet 34 and threaded aperture in plate 21 to receive screws 55.

Panelboard 100 includes two identical insulating blocks 102, and secured to each of the insulating blocks 102 are straps 103, 104 and a third strap 103' identical in construction to strap 103. Strap 103 includes an L-shaped body 105, a foot 106 extending at right angles to member 105 near the free end of the leg thereof, and an inclined portion 107 extending upwardly from the free end of the arm of member 105. The portion 108 at the free end of inclined portion 107 is turned at right angles to L-shaped portion 105 so as to be parallel to foot 106. Portion 108 is provided with two threaded apertures 109 adapted to receive bolts which electrically connect and mechanically secure bolted circuit breakers to panelboard 100.

Strap 104 includes a foot 111, a connecting portion 112 extending upwardly at right angles from foot 111, inclined portion 113 extending upwardly from the free end of portion 112, and a bent over portion 114 at the upper end of inclined portion 113 positioned parallel to foot 111 and extending in the same direction. Portion 114 is provided with threaded aperture 115 adapted to receive bolts which mechanically secure and electrically connect bolted type circuit breakers to panelboard 100, while the foot 106 of strap 103' is disposed within insulator recess 117. Foot 111 in turn is disposed within insulator recess 118.

It is to be noted that strap portions 108, 114 lie in a single plane and are aligned in a single row parallel to bus bars 44, 45, 45' being centered between mounting ledges 32, 33. Thus, threaded apertures 109 and 115 are aligned in two rows parallel to bus bars 44, 45, 45'.

As readily seen by a comparison of FIGURE 2A and 3 the panelboard 100 to receive bolted type circuit breakers may instead readily be constructed to be a panelboard 125 (FIGURE 3) to receive plug-in type circuit breakers. This is accomplished merely by substituting conducting straps 60 for conducting straps 103 and substituting conducting straps 61 for conducting straps 104.

It is to be noted that the plug-in type circuit breaker 126 adapted to be mounted to panelboard 125 includes a housing whose length X is equal to the length Z of the housing for bolted type circuit breaker 127 which is adapted to be mounted to panelboard 100. The additional length of circuit breaker 127 over circuit breaker 126 results from line terminal 128 and interphase barrier 129 which project from the end of the housing.

In panelboard 100, while there is sufficient voltage clearance between the vertical portion 112 and the arm of L-shaped portion 105 there is not sufficient voltage clearance in air between horizontal portions 108 and 114. With circuit breakers 127 mounted to all locations of panelboard 100 barriers 129 provide the necessary dielectric barriers between portions 108 and 114. If a circuit breaker location of panelboard 100 is not occupied by a circuit breaker, voltage clearance is maintained by inserting an interphase barrier 200 of the type clearly illustrated in FIGURE 10.

Interphase barrier 200 comprises a vertical insulating sheet 201 and a horizontal insulating sheet 202 secured thereto by a forced fit. Sheet 201 is provided with a centrally located horizontal slot 203. The main portion 204 of sheet 202 is inserted through slot 203 and the tight fit therebetween secures sheet 201 to sheet 202. Ears 205, 206 of member 202 are positioned on one side of sheet 202 while clearance hole 207 through main portion 204 is positioned on the other side of sheet 202. An appropriate screw passing through clearance hole 207 and received by one of the threaded apertures 109, 115 secures interphase barrier 200 to one of the straps 103, 104.

It is seen that the single phase plug-in type panelboard 20 of FIGURES 1 and 1A may readily be converted to a panelboard which receives bolted type circuit breakers. This is accomplished by substituting straps 103, 104 and 103' for straps 60, 61 and 62, respectively.

Thus, this invention provides novel panelboard constructions whereby the panelboard assembler need stock a minimum number of parts and still be able to construct both single and three phase panelboards of either bolted or plug-in construction. Further, the three phase panelboards are constructed in a manner such that only two different type connecting straps are required.

Although I have here described preferred embodiment of my novel invention, many variations and modifications will now be apparent to those skilled in the art, and I therefore prefer to be limited, not by the specific disclosure herein, but only by the appending claims.

I claim:
1. A panelboard including a first and a second mounting ledge parallel to each other and spaced apart a distance sufficient to permit mounting of two bolted circuit breakers in end to end relationship with each of these circuit breakers having a line terminal which projects beyond an end of the circuit breaker housing, a plurality of spaced elongated bus bars positioned between said ledges and extending generally parallel thereto, an insulating block having grooves in a back surface thereof through which said bus bars extend, a plurality of straps having rigid portions extending into recesses of said block in a front surface thereof, first means engaging said rigid portions and electrically connecting each of said straps to one of said bus bars, each of said straps also having another portion constructed to have two circuit breakers electrically connected thereto, said recesses operatively positioned and constructed to receive straps having threaded apertures for connection of bolted circuit breakers as well as straps having blades constructed and positioned to receive plug-in circuit breakers having housing lengths equal to the housing lengths of the previously recited bolted circuit breakers, each of said straps having threaded apertures being so constructed that the replacement thereof by straps having blades does not require the repositioning of said mounting ledges in order to mount plug-in circuit breakers.

2. A panelboard including a first and a second mounting ledge parallel to each other and spaced apart a distance sufficient to permit mounting of two bolted circuit breakers in end to end relationship with each of these circuit breakers having a line terminal which projects beyond an end of the circuit breaker housing, a plurality of spaced elongated bus bars positioned between said ledges and extending generally parallel thereto, an insulating block having grooves in a back surface thereof through which said bus bars extend, a plurality of straps having rigid portions extending into recesses of said block in a front surface thereof, first means engaging said rigid portions and electrically connecting each of said straps to one of said bus bars, each of said straps also having another portion constructed to have two circuit breakers electrically connected thereto, said recesses operatively positioned and constructed to receive straps having threaded apertures for connection of bolted circuit breakers as well as straps having blades constructed and positioned to receive plug-in circuit breakers having housing lengths equal to the housing lengths of the previously recited bolted circuit breakers; said first means also mechanically securing said bus bars and said straps to said block, each of said straps having threaded apertures being so constructed that the replacement thereof by straps having blades does not require the repositioning of said mounting ledges in order to mount plug-in circuit breakers.

3. A panelboard including a first and a second mounting ledge parallel to each other and spaced apart a distance sufficient to permit mounting of two bolted circuit breakers in end to end relationship with each of these circuit breakers having a line terminal which projects beyond an end of the circuit breaker housing, a plurality of spaced elongated bus bars positioned between said ledges and extending generally parallel thereto, an insulating block having grooves in a back surface thereof through which said bus bars extend, a plurality of straps having rigid portions extending into recesses of said block in a front surface thereof, first means engaging said rigid portions and electrically connecting each of said straps to one of said bus bars, each of said straps also having another portion constructed to have two circuit breakers electrically connected thereto, said recesses operatively positioned and constructed to receive straps having threaded apertures for connection of bolted circuit breakers as well as straps having blades constructed and positioned to receive plug-in circuit breakers having housing lengths equal to the housing lengths of the previously recited bolted circuit breakers; said first means also mechanically securing said bus bars and said straps to said block; said first means providing the sole securement for said bus bars to said block, each of said straps having threaded apertures being so constructed that the replacement thereof by straps having blades does not require the repositioning of said mounting ledges in order to mount plug-in circuit breakers.

4. The panelboard as set forth in claim 1 further including an individual strap entered into each of said recesses, means individually securing each of said straps to a one of said bus bars, each of said straps including a first and a second threaded aperture each positioned to connect a bolted type circuit breaker to said panelboard, an interphase barrier removably secured by means engaging one of said threaded apertures, said barrier comprising first and second insulating sheets arranged in perpendicular planes, said second sheet extending through a slot in said first sheet and being secured thereto by a forced fit between said second sheet and portions of said first sheet defining said slot.

5. A panelboard including a first, a second, and a third elongated bus bar arranged in spaced parallel relationship with said second bus bar positioned between said first and said third bus bars, an insulating block having grooves in the back surface thereof with said bus bars extending through said grooves, a first, a second, and a third strap each having a rigid portion electrically connected to said first, said second, and said third bus bars, respectively, by means extending through apertures in said block, said straps having other portions constructed to electrically connect two circuit breakers mounted end to end, said first and said third straps having identical constructions, said second strap differing in construction from the construction of said first strap, said other portions of each of said straps being in alignment parallel to said bus bars; circuit breaker mounting means on opposite sides of said bus bars when considered as a group, and extending parallel thereto, said mounting means being spaced apart a distance sufficient to permit end to end mounting of two bolted circuit breakers in abutting relationship with each of these circuit breakers having a line terminal which projects beyond an end of the circuit breaker housing; said mounting block being constructed to operatively position straps having blades for connections to a pair of plug-in circuit breakers having housings whose lengths equal the housing lengths of the previously mentioned bolted circuit breakers without the necessity of repositioning said circuit breaker mounting means.

References Cited by the Examiner

UNITED STATES PATENTS

| | | | |
|---|---|---|---|
| 2,735,043 | 2/56 | Speck | 317—119 |
| 2,739,272 | 3/56 | Norden | 317—119 |
| 2,790,113 | 4/57 | Brown | 317—119 |
| 2,951,184 | 8/60 | Wyma | 317—101 |
| 3,054,934 | 9/62 | Kenyeres et al. | 317—119 |
| 3,041,505 | 6/62 | Norden | 317—119 |

JOHN F. BURNS, *Primary Examiner.*

SAMUEL BERNSTEIN, *Examiner.*